July 26, 1949.　　　　　H. M. REEVES　　　　　2,477,546
BROILER
Filed Jan. 8, 1944　　　　　　　　　　　　　　　2 Sheets-Sheet 1
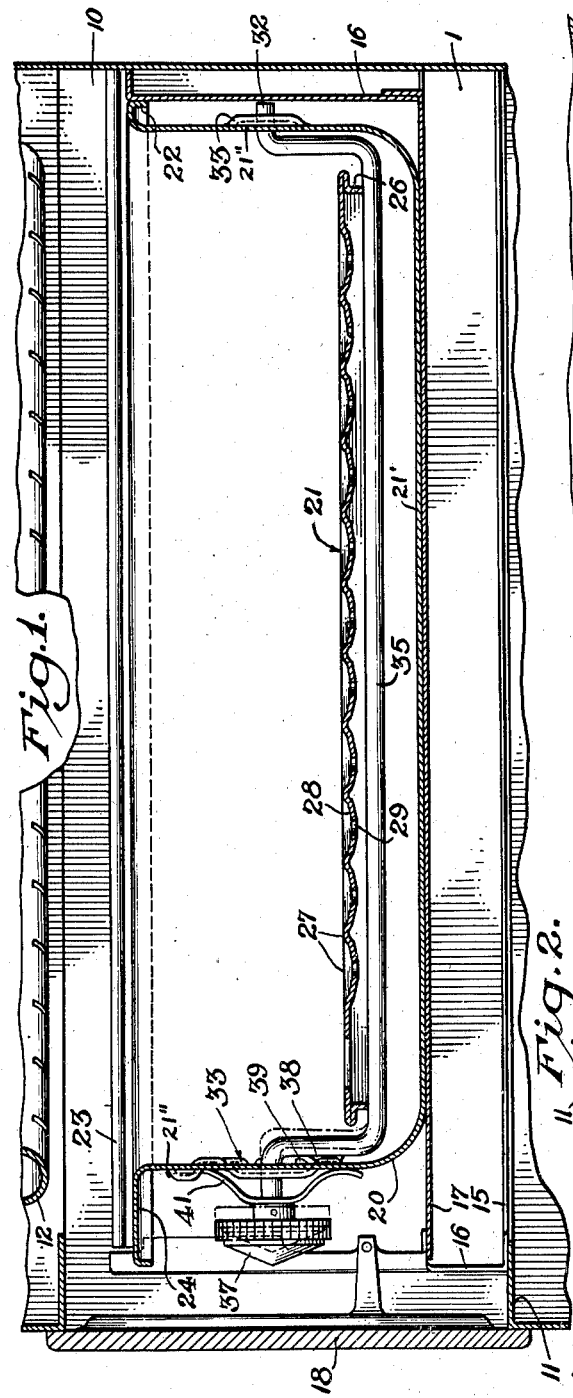
Inventor
Herbert M. Reeves.
BY
Carlson, Pitzner, Hubbard & Wolfe
Attorneys.

July 26, 1949.  H. M. REEVES  2,477,546
BROILER
Filed Jan. 8, 1944  2 Sheets-Sheet 2

Inventor
Herbert M. Reeves
BY
Carlson, Pitzner, Hubbard & Wolfe
Attorneys.

Patented July 26, 1949

2,477,546

UNITED STATES PATENT OFFICE 2,477,546

BROILER

Herbert M. Reeves, Kankakee, Ill., assignor to Florence Stove Company, Gardner, Mass., a corporation of Massachusetts Application January 8, 1944, Serial No. 517,532

5 Claims. (Cl. 99—446)

The invention relates to broilers generally and more particularly to an improved broiler for use in cooking stoves and ranges.

One object of the invention is to provide an improved adjustable grid broiler suitable for use in the broiler drawers of cook stoves in which the grid adjusting mechanism is assembled with the drip pan for insertion in the removal from the drawer as a unit.

Another object is to provide a broiler assembly of the above type in which the juices and grease are collected and retained at a sufficient distance from the burner to prevent overheating, thus eliminating smoke and fumes and effectually avoiding any danger of grease being ignited.

Another object is to provide a grid adjusting mechanism of novel and advantageous construction which permits the use of a much deeper broiler pan than has heretofore been practical.

Another object is to provide an adjustable grid broiler which is easy to clean.

Still another object is to provide novel mechanism by which the spacing of the broiler grid and its angular disposition with respect to the burner may be conveniently adjusted.

It is also an object of the invention to provide an adjustable grid broiler which is simple and rugged in construction, efficient and reliable in operation and relatively inexpensive to manufacture.

Other objects and advantages of the invention will become apparent from the following detailed description of the preferred embodiment in which:

Figure 1 is a longitudinal vertical sectional view of a broiler embodying the features of the invention, the broiler being shown in place in a conventional stove broiler drawer.

Fig. 2 is a transverse sectional view through the broiler drawer showing the broiler in end elevation.

Figure 3:
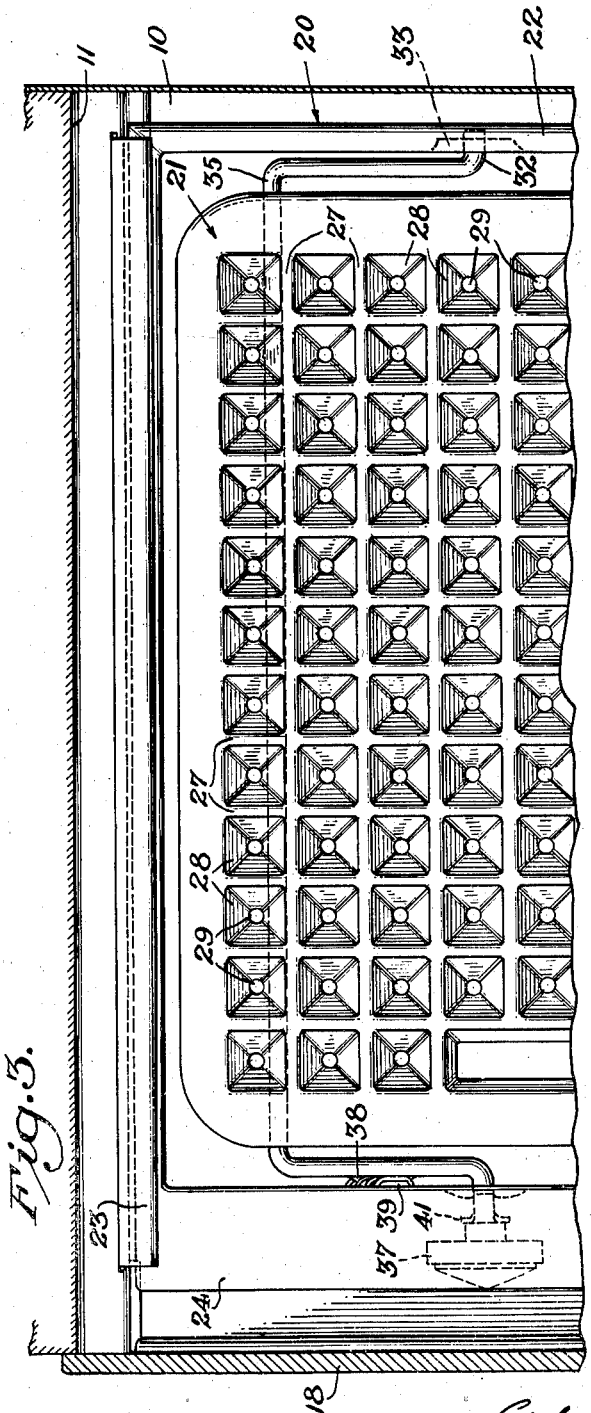
Fig. 3 is a fragmentary plan view of the broiler.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration the improved broiler constituting the present invention has been shown in the form adapted for use in a broiler drawer of the type provided in conventional gaseous fuel cooking stoves. The drawer is removably inserted in a broiler oven 10 in the body 11 of the stove below a suitable burner 12.

A typical broiler drawer comprises a generally rectangular outer shell 15 of sheet metal adapted to fit in the oven 10 for in and out sliding movement. Internal supporting members 16 which may be integral with or rigidly attached to the outer shell in any suitable manner support a channel-shaped inner shell 17 so as to provide an insulating air space between the two shells. The inner shell defines a relatively deep upwardly opening compartment for broiler apparatus. Both the inner and outer shells are usually open at their forward ends to permit insertion and removal of the broiler apparatus without necessitating withdrawal of the drawer from the oven. A door 18 pivotally supported on the outer shell 15 of the drawer serves as a closure for the oven.

In carrying out the invention I provide a sheet metal drip pan 20 adapted to rest directly on the bottom of the broiler drawer. Mechanism accessible from the outside of the pan is assembled as a unit therewith for supporting a food carrying grid 21 in various adjusted positions with respect to the burner 12. The pan 20, as herein shown, is generally rectangular in form and comprises a bottom wall 21' and upright side and end walls 21''. Preferably the side and end walls are relatively high, those of the exemplary pan being dimensioned so as to provide a pan structure of substantially the same depth as the broiler drawer. The pan may conveniently be of one piece construction and is preferably shaped so that there are no crevices or corners in which dirt or grease can lodge. Moreover, the side walls and rear end wall of the pan may be formed at their upper edges with an outturned flange 22 adapted to fit under an inturned flange 23 on the inner drawer shell 17 to prevent any foreign material from falling into the drawer. Preferably the front end wall of the pan is formed with a flange 24 of substantially greater width than the flange 22 but merging therewith and projecting forwardly to serve as a guard for the grid adjusting mechanism to be described hereinafter.

The grid 21 may be of any suitable type and, as herein shown, comprises a flat, generally rectangular sheet metal plate formed with a stiffening flange 26 around its outer edge. A series of cross ridges 27 on the upper face of the plate provide a non-skid surface for the foodstuff carried thereon. The ridges 27 are formed, in this instance, by a plurality of parallel rows of substantially square indentations 28 pressed in the plate. A hole 29 is provided in the bottom of each indentation to permit liquid and grease from the foodstuff to drain into the pan 20.

Simple, easily operated mechanism is assembled as a unit with the pan 20 for supporting the grid 21 on the walls of the pan so that its spacing with reference to the burner 12 may be adjusted through a wide range and whereby its angular position may be varied for the accommodation of food items of irregular shape. The supporting and adjusting mechanism comprises a pair of adjusting members, 31 and 32, herein shown as rotatable shafts extending longitudinally of the pan 20. The ends of the shafts project through the front and rear end walls of the pan and are rotatably supported thereon in bearings formed in bosses 33 pressed in the ends of the pan.

The use of a deep pan, such as the pan 20 shown, permits the bearings for the shafts 31 and 32 to be spaced a substantial distance above the bottom of the pan, the lower portion of the pan thus providing a liquid tight receptacle for the collection of a relatively large quantity of liquid without leakage into the broiler drawer. Moreover, the pan may rest directly on the bottom of the broiler drawer so that the collected grease and liquids are held sufficiently far from the burner 12 to avoid overheating whereby smoking or ignition of the grease is eliminated. The high walls to the pan also minimize splashing of the heated liquids on the broiler drawer.

The portions of the shafts 31 and 32 disposed within the pan 20 are similarly offset to provide a pair of crank sections 34 and 35 upon which the grid 21 is adapted to rest. Due to the offset arrangement of the crank sections, the grid may be raised or lowered by rotation of the shafts about their respective axes. In a deep pan of the type employed in the present instance, with the shaft bearings spaced well above the bottom of the pan, the offset of the shafts may be relatively large thus providing a wide range of adjustment for the grid. Thus, in the exemplary broiler, the grid may be shifted between the upper and lower limit positions shown in broken lines in Fig. 2 of the drawings. As the shafts 31 and 32 are independently rotatable, the angular position of the grid may be readily adjusted by turning one or the other of the shafts to set its crank section at an angle to the corresponding section of the companion shaft.

Rotation of the grid supporting and adjusting shafts is effected manually, in this instance, by knobs 36 and 37 pinned or otherwise fixed on the projecting forward ends of the respective shafts. The knobs are readily accessible from the front of the broiler drawer permitting such adjustment without withdrawing the pan from the drawer. As will be seen by reference to Fig. 1 the guard flange 24 extends over the knobs thus preventing overheating by radiation from the burner 12.

Figure 4:
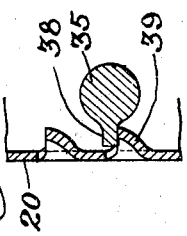
Fig. 4 is a fragmentary sectional view through the front wall of the broiler pan showing the detent means for holding the broiler grid in adjusted position.

Simple yet effective means is provided for releasably latching the grid supporting shafts 31 and 32 in selected positions of adjustment. For this purpose, a forwardly projecting lug 38 is formed on the crank sections 34 and 35 of the shafts adjacent the front wall of the pan 20. A plurality of nibs or indentations 39 are struck inwardly from the front wall of the pan for cooperation with the lugs 38. As shown in Fig. 4, the nibs 39 are formed to present upwardly facing square shoulders effective to positively hold the grid in adjusted position. In the exemplary broiler, the nibs are arranged in groups arcuate about the axes of the respective shafts and progressively spaced from the bottom of the pan so that adjustment of the grid may be effected in relatively small steps.

Means is provided for yieldably holding the lugs 38 in latching engagement with the nibs 39 while permitting convenient release when readjustment is to be made. The holding means, in this instance, comprises a generally U-shaped spring member 41 associated with each of the shafts and interposed between the front wall of the pan 20 and the rear face of the adjusting knob attached to the shaft. Each of the spring members is formed with a hole for the accommodation of the shaft which thus serves to hold the member in assembled relation with the other elements of the broiler structure. To prevent rotation of the spring members when the shaft is turned, the upper ends of the members are confined between spaced lugs 42 struck out from the end wall of the pan 20.

The lugs 38 may be released from latching engagement with the nibs 39 by pushing in the adjusting knob so as to spring the associated shaft to the dotted line position shown in Fig. 1. The shaft may thus be turned to any selected position and, upon release of the knob, the spring member 41 returns it to normal position shown in full lines in Fig. 1 whereby the shaft is effectually latched in the adjusted position.

It will be apparent from the foregoing that the invention provides a broiler of novel and advantageous construction particularly well adapted for use in broiler drawers of the type commonly installed in gaseous fuel cook stoves. The improved grid adjusting mechanism makes possible the use of a much deeper broiler pan than has heretofore been practicable. Liquids and grease collected from the foodstuff cooked in the broiler are thus held a substantial distance from the burner whereby overheating or ignition of the same is effectually prevented. The high walls of the pan also prevent splashing of the drawer structure with the heated liquids.

The unitary character of the improved broiler permits the entire broiler assembly including the drip pan the grid and the grid supporting mechanism to be removed from the stove drawer as a unit so that it can be cleaned very easily and conveniently. As the grid supporting and adjusting mechanism is of simple construction and since only the shafts 31 and 32 are disposed within the pan all parts of the structure upon which grease or the like is apt to collect are readily accessible for cleaning. Cleaning is further facilitated by constructing the pan so as to eliminate all crevices and corners in which grease or dirt could lodge.

The adjusting mechanism itself is extremely simple in construction and correspondingly inexpensive to manufacture. It is rugged and not likely to get out of order. Moreover it provides a very wide range of grid adjustment both vertically and angularly and such adjustments may be made conveniently from the outside of the pan without necessitating removal of the pan from the broiler drawer. The adjusting means is adequately protected from grease and liquids produced by the food being cooked in the broiler and it is likewise effectually shielded from overheating by radiation from the burner. Adjustments of the grid are maintained by simple efficient latch mechanism which is readily releasable when adjustment of the grid is required.

I claim as my invention:

1. A broiler assembly comprising, in combination, a pan having side and end walls, a food carrying grid, means supporting said grid in said pan for vertical adjustment including a pair of shafts each having an off-set section upon which said grid is adapted to rest, said shafts being rotatably supported at opposite ends on the end walls of said pan, means operable to turn said shafts for adjusting the position of said grid, a lug formed on the off-set section of each shaft adjacent one end wall of said pan, and a series of nibs struck inwardly from said one end wall of the pan adjacent each of said shafts for cooperation with said lugs in holding the shafts in adjusted position.

2. A broiler assembly comprising, in combination, a pan having bottom, side and end walls, a food carrying grid, grid supporting and adjusting means including a pair of shafts extending through and journaled on the end walls of the pan, each of said shafts having an off-set section within the pan upon which said grid is adapted to rest, a knob on the outer end of each shaft for turning the same to adjust the position of the grid, a lug formed on the off-set section of each shaft, nibs struck out from one end wall of the pan for engagement by said lugs to hold the shafts in adjusted positions, and spring means interposed between said one end wall of said pan and said knobs yieldably urging said lugs into engagement with said nibs.

3. A broiler assembly comprising, in combination, a pan having bottom, side and end walls, a grid adjusting shaft extending through and journaled in the end walls of the pan, said shaft having an off-set section within the pan for adjustably supporting a grid, a knob on the outer end of the shaft for turning the same, a projection on the off-set section of the shaft adjacent said one end thereof, spaced nibs on one end wall of said pan engageable by said projection to hold the shaft in adjusted positions, a U-shaped spring member interposed between said one end wall and said knob for yieldably urging said projection into engagement with said nibs, and a pair of lugs struck out from said one end wall on opposite sides of said spring member operative to prevent the rotation of the member when said shaft is turned.

4. A broiler assembly comprising, in combination, a generally rectangular pan having an imperforate bottom wall and upright side and end walls of substantial depth, a food carrying grid, means supporting said grid on the end walls of the pan for movement vertically between a position closely adjacent the bottom of the pan and a position closely adjacent the top of the pan, said supporting means including a pair of members upon which the pan rests and an adjusting member disposed forwardly of the pan, the front end wall of the pan being apertured to permit the adjusting member to extend therethrough for convenient manual adjustment from the exterior of the pan, said aperture in said front end wall being located a substantial distance above said bottom wall to provide a relatively deep liquid-tight compartment for the reception of liquids draining from the food carried on said grid, said end walls and said side walls extending substantially above said aperture to prevent splashing of the collected liquids from the pan.

5. A broiler assembly comprising, in combination, a generally rectangular pan having an imperforate bottom wall and upright side and end walls of substantial depth, a food carrying grid, means supporting said grid for movement vertically between a position closely adjacent the bottom of the pan and a position closely adjacent the top of the pan, said supporting means including a pair of rotatable members, said end walls being apertured to provide bearings for said members, the apertures in said end walls being located a substantial distance above said bottom wall to provide a relatively deep liquid-tight compartment for the reception of liquids draining from the food carried by said grid, said end and side walls extending substantially above said apertures to prevent splashing of the collected liquids from the pan, operating knobs on the ends of said members projecting through said front end wall for rotating the members to adjust the position of said grid, and means on said front end wall coacting with said members to retain them in adjusted positions.

HERBERT M. REEVES.

REFERENCES CITED

The following references are of record in the file of this patent:

UNITED STATES PATENTS

| Number | Name | Date |
| --- | --- | --- |
| 1,416,478 | Lamb | May 16, 1922 |
| 1,808,768 | Dibble | June 9, 1931 |
| 1,840,460 | Maul | Jan. 12, 1932 |
| 1,852,087 | Pape | Apr. 5, 1932 |
| 1,960,365 | Barker | May 29, 1934 |
| 2,029,718 | Hobson | Feb. 4, 1936 |
| 2,047,979 | Mills | July 21, 1936 |
| 2,106,506 | Pletcher et al. | Jan. 25, 1938 |
| 2,119,012 | Kahn | May 31, 1938 |
| 2,119,898 | Weston | June 7, 1938 |
| 2,125,989 | Burch | Aug. 9, 1938 |